United States Patent [19]

Orimoto

[11] Patent Number: 5,761,557
[45] Date of Patent: Jun. 2, 1998

[54] FILM TRANSPORT DEVICE

[75] Inventor: Masaaki Orimoto, Asaka, Japan

[73] Assignee: Fuji Photo Film Co., Ltd., Kanagawa, Japan

[21] Appl. No.: 731,014

[22] Filed: Oct. 9, 1996

[30] Foreign Application Priority Data

Oct. 13, 1995 [JP] Japan .................................. 7-265806
Sep. 20, 1996 [JP] Japan .................................. 8-250638

[51] Int. Cl.$^6$ .................................................. G03B 1/00
[52] U.S. Cl. .................... 396/411; 396/415; 226/187; 226/194
[58] Field of Search .............................. 396/387, 411, 396/415, 418; 352/166, 186; 226/183, 186, 187, 190, 193, 194; 242/564.3, 564.4

[56] References Cited

U.S. PATENT DOCUMENTS

| | | | |
|---|---|---|---|
| 2,858,130 | 10/1958 | Baur et al. | 226/183 |
| 4,790,125 | 12/1988 | Merritt, III | 226/183 |
| 4,932,577 | 6/1990 | Weiss | 226/187 |
| 5,344,058 | 9/1994 | Baffo | 226/186 |
| 5,540,373 | 7/1996 | Sugizaki et al. | 226/186 |

*Primary Examiner*—Eddie C. Lee
*Attorney, Agent, or Firm*—Sughrue, Mion, Zinn, Macpeak & Seas, PLLC

[57] ABSTRACT

One end of both pinch roller shafts of a pair of pinch rollers is arranged at the first bearing member, and at the second bearing member the other end is arranged. The first and second bearing members are supported rotatably around a supporting shaft provided in a holder. Hence, the capstan roller can remain tightly in contact with the pinch roller, and the film can be prevented from sliding on the capstan, so that the film can be transported accurately.

14 Claims, 8 Drawing Sheets

FILM TRANSPORT DEVICE

BACKGROUND OF THE INVENTION

1. Field of the Invention

The present invention relates to a film transport device. More particularly, the present invention relates to a film transport device which is provided with a capstan for controlling the film transport speed.

2. Description of the Related Art

A capstan for controlling the film transport speed is usually provided between a film supply unit and a film windup unit, which is composed of a windup reel for winding up a film supplied from the film supply unit. A pinch roller is provided in such a manner as to face the capstan, and the pinch roller presses the film against a rotatable member such as a capstan roller, etc. in the capstan. Then, the film is transported smoothly, being pinched between the pinch roller and the capstan roller, so that the film transport speed can be controlled accurately by controlling the speed of the rotation of the capstan roller.

In a film scanner, etc. which captures a film image on a photographic film, etc. and outputs the captured film image to a screen monitor and a printer, it is important to control the film transport speed, which greatly influences a regenerated image.

If the film is transported, being pinched between the capstan roller, which is the rotatable member of the capstan, and one pinch roller as usual, there is a problem in that the film sliding amount varies according to the change in the tension given to the film, and the film transport speed is unstable as a result.

In particular, if a film cartridge is housed in the film supply unit, the film is pulled out from the film cartridge, and the film is wound up by the windup reel of the film windup unit; the transporting force for overcoming the load is required for the capstan roller and the pinch roller so that the film can be pulled out from the film cartridge. Moreover, resistance is also required for preventing the film from being pulled out by the winding force of the windup reel.

The capstan roller is usually opposite to the pinch roller with respect to the direction of transporting the film. If relative positions of the capstan roller and the pinch roller are displaced, the transporting accuracy changes according to the direction of transporting the film. Further, if the film is transported at a constant speed in both the feed direction and the rewind direction, the transporting accuracy needs to be equal in both directions.

SUMMARY OF THE INVENTION

It is an object of the present invention to provide a film transport device which prevents film from sliding on a capstan, thereby improving the film transporting accuracy.

It is another object of the present invention to provide a film transport device wherein the film can be desirably pinched between a capstan roller and a pinch roller when the pinch roller is pressed, even if the relative positions of the capstan roller and the pinch roller are displaced.

It is yet another object of the present invention to provide a film transport device wherein the transporting accuracy can be equal in both a feed direction and a rewind direction, when the film is transported at a constant speed in both directions.

In order to achieve the above-mentioned objects, a film transport device which transports a film at a constant speed by rotating a capstan roller with the film being pinched between the capstan roller and a pair of pinch rollers pressed on the capstan roller, is characterized in that one end of both pinch roller shafts of the pinch rollers is arranged at the first bearing member and the other end is arranged at the second bearing member, and the first and second bearing members are supported rotatably around a supporting shaft provided in a holder. Hence, even if the relative positions of the capstan roller and the pinch rollers are displaced, the pinch rollers shift around the supporting shaft so as to be parallel to the capstan roller when the pinch rollers are pressed. Moreover, there is a clearance provided between each end of both of the pinch roller shafts and each of the first and second bearing members, and hence the pinch roller shafts can be parallel to the capstan roller. Further, when the pinch roller at the film exit side shifts in the direction to exit, the pinch roller at the film entry side inroads into the capstan roller. Thereby, the film can be transported desirably at a constant speed in both the feed direction and the rewind direction.

Furthermore, the present invention is directed to the film transport device which transports the film at a constant speed by rotating the capstan roller with the film being pinched between the capstan roller and the pinch roller pressed on the capstan roller, is characterized in that the diameter of the capstan roller is larger than that of the pinch roller, and the material of the capstan roller is softer than that of the pinch roller, and the capstan roller hence changes its shape by the pressure of the pinch roller such that the pinch roller inroads into the capstan roller. Thus, the film as well as the pinch roller inroads into the capstan roller, so that the film can be prevented from sliding, and the film can be transported desirably.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
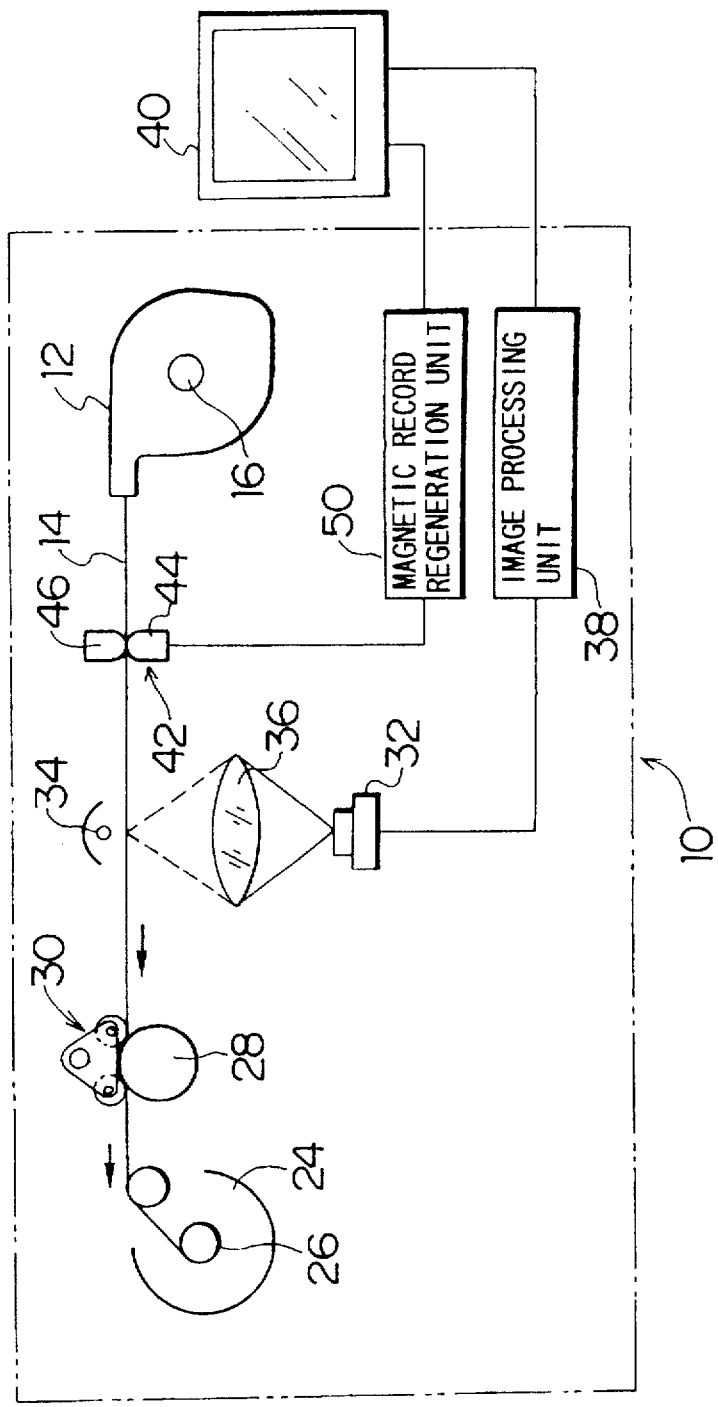
FIG. 1 is a view illustrating the entire structure of an embodiment of a film player including the film transport device according to the present invention.
Figure 2:
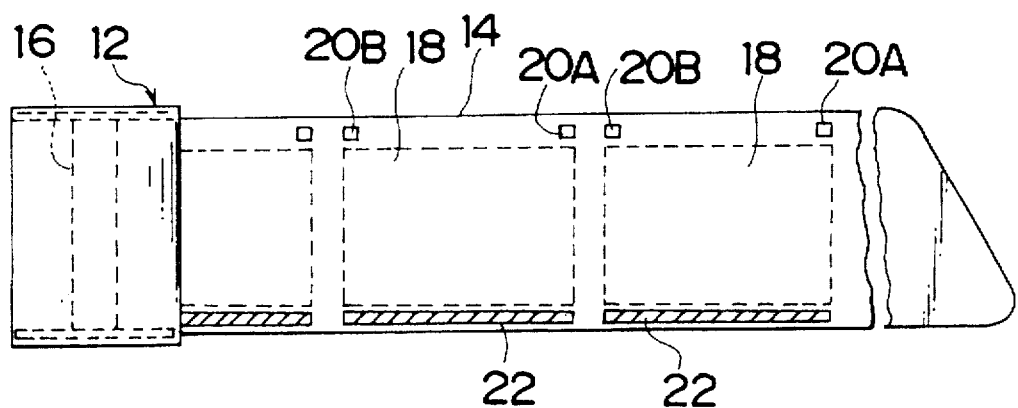
FIG. 2 is a plan view of a photographic film.

FIG. 1 is a view illustrating the entire stricture of the film player including the film transport device according to the present invention. A film cartridge 12 is mounted in the film player 10, which is shown with a chain double-dashed line of FIG. 1. In the film cartridge 12, developed photographic film 14 is wound on a spool 16 previously. As shown in FIG. 2, frames 18, 18, . . . , in which images are recorded, are formed at regular intervals on the film 14 in its longitudinal direction. Holes 20A, 20B indicating the frame 18 are punched at the start and end of each frame 18, and a magnetic record layer 22 is formed on the whole surface of the film or the edge of the film. The magnetic record layer 22 can record the magnetic data such as the photographing data for each frame, or the like.

The film 14 is transported from the film cartridge 12 in FIG. 1 by a film driving mechanism (not shown) in the direction of arrows in FIG. 1. The film driving mechanism comprises a film supply unit, which is engaged with the spool 16 of the film cartridge 12, for rotating the spool 16 forward and backward, a film windup unit, which is engaged with a windup spool 26 in a film windup chamber 24, for winding up the film 14 sent from the film supply unit, and a film transport device according to the present invention, which transports the film 14 at a constant speed with the film 14 being pinched between a capstan 28 and a pinch roller mechanism 30. The pinch roller mechanism 30 will be explained later.

The film supply unit rotates the spool 16 of the film cartridge 12 counterclockwise, and it transports the film 14 from the film cartridge 12 until the lead of the film 14 passes the capstan 28 or the forward end of the film 14 is wound up by the windup spool 26. The film supply unit is provided with a clutch mechanism which controls the rotation of the spool 16, and the film 14 is transported by the capstan 28 and the tension of the film 14 is controlled by the clutch mechanism to be a predetermined tension.

On the other hand, a charge coupled device (CCD) line sensor 32 is provided on a film transport passage between the film supply unit and the film windup unit. The CCD line sensor 32 is arranged in the direction perpendicular to the feed direction of the film 14, and it captures a transmitted image of the film 14, which is being transported and is illuminated by a light source 34, through a taking lens 36. The image processing is performed for an electric signal, which is converted by each photoelectric converting element of the CCD line censor 32, by an image processing unit 38. Then, the electric signal is output as a video signal to a TV monitor 40. The image of the film 14 is thereby displayed on the TV monitor 40.

A magnetic head unit 42 is provided on the film transport passage between the film supply unit and the film windup unit. The magnetic head unit 42 is composed of a magnetic head 44 fixed below the film 14, and a pad 46, which is pushed by a spring to abut on the magnetic head 44 via the film 14. The magnetic head 44 can record the magnetic data on the magnetic record layer 22 on the film 14, and it can also read the magnetic data recorded on the magnetic record layer 22. The magnetic data read by the magnetic head 44 is regenerated by a magnetic data regenerating unit 50 shown in FIG. 1, and the magnetic data as well as the film image is displayed on the TV monitor 40.

Next, a detailed explanation will be given about the film transport device according to the present invention, which comprises the capstan 28 and the pinch roller mechanism 30.

Figure 3:
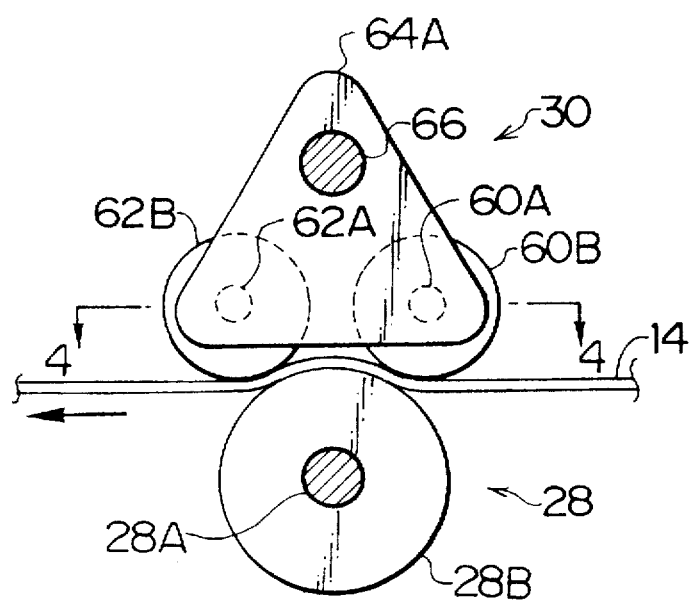
FIG. 3 is a side view illustrating the essential parts of the film transport device according to the present invention.
Figure 4:
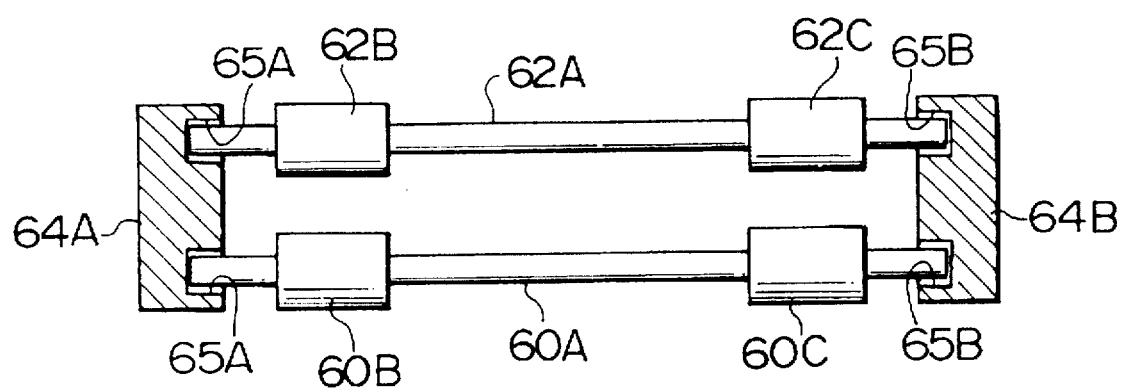
FIG. 4 is a sectional view taken on line 4—4 of FIG. 3.
Figure 5:
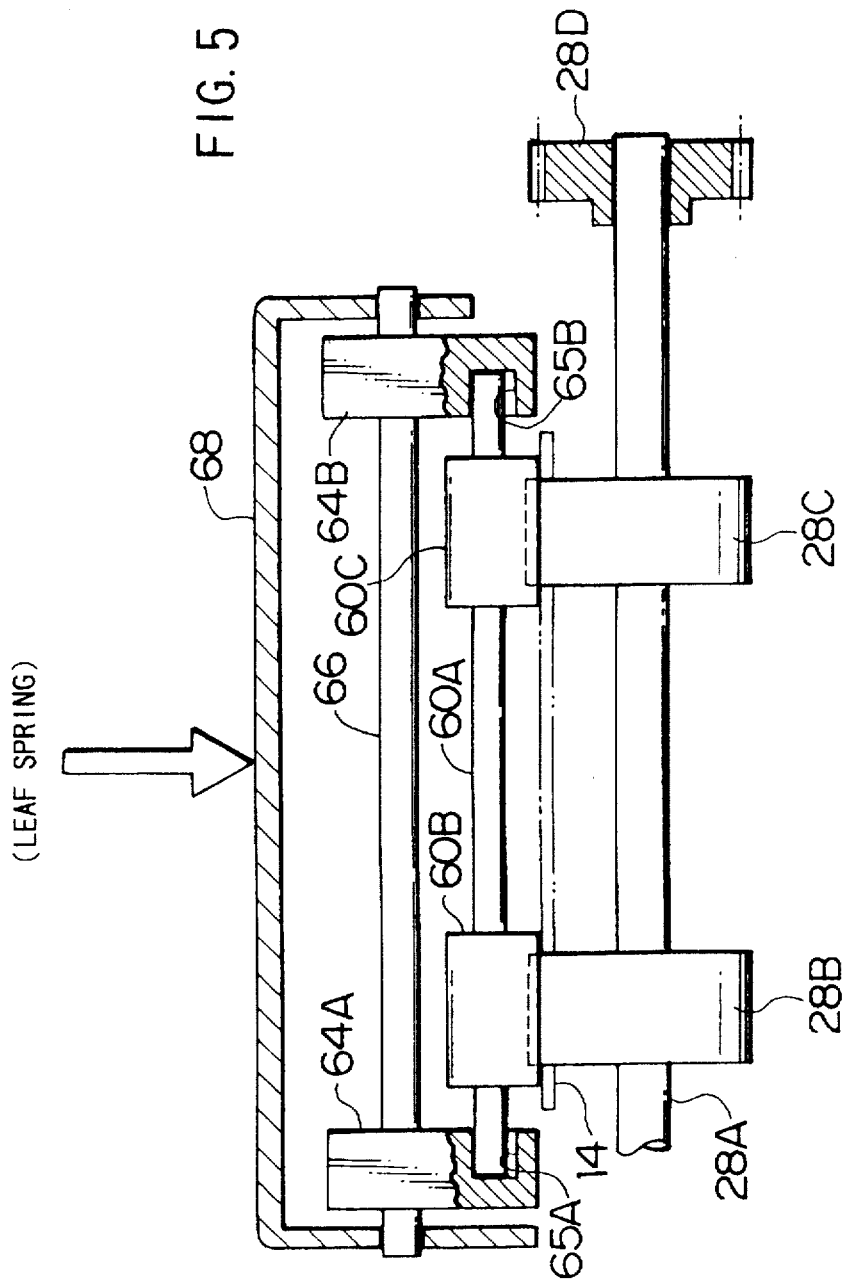
FIG. 5 is a front view illustrating the essential parts of the film transport device in FIG. 3.
Figure 6:
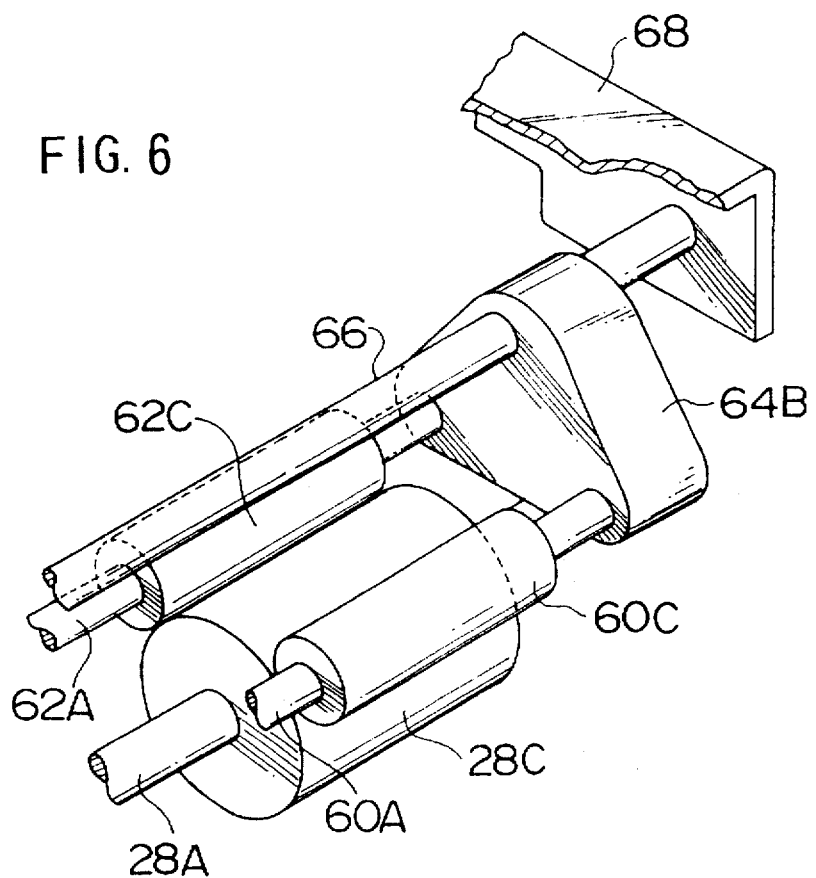
FIG. 6 is a perspective view illustrating the essential parts of the film transport device in FIG. 3.

FIG. 3 is a side view illustrating the essential parts of the film transport device according to the present invention. FIG. 4 is a sectional view taken on line 4—4 of FIG. 3. FIGS. 5 and 6 are a front view and a perspective view, respectively, illustrating the essential parts of the film transport device.

As shown in FIGS. 3 and 5, the capstan 28 is provided below the film 14, and the capstan 28 consists of a capstan shaft 28A, to which the driving force for the forward and backward rotation is transmitted via a driving gear 28D, and capstan rollers 28B and 28C secured to the capstan shaft 28A.

On the other hand, as shown in FIGS. 3 and 4, the pinch roller mechanism 30 is provided above the film 14, and it mainly comprises a pair of pinch roller shafts 60A and 62A, pinch rollers 60B, 60C, 62B, and 62C provided at the pinch roller shafts 60A and 62A, bearing members 64A and 64B supporting the pinch roller shafts 60A and 62A, a supporting shaft 66, which rotatably supports the bearing members 64A and 64B, and a holder 68 (see FIGS. 5 and 6) holding the supporting shaft 66.

That is, the pinch roller shaft 60A is provided with the pinch rollers 60B and 60C, and the pinch roller shaft 62A is provided with the pinch rollers 62B and 62C. The pinch roller shafts 60A and 62A are held between the bearing members 64A and 64B. Each of the bearing members 64A and 64B is rotatably supported by the supporting shaft 66. The supporting shaft 66 is at the equal distance from the two pinch roller shafts 60A and 62A as shown in FIG. 3. The pinch roller shafts 60A and 62A are symmetrical with respect to the supporting shaft 66.

The supporting shaft 66 is held by the holder 68 as shown in FIG. 5, and the holder 68 is pushed toward the capstan 28 by a leaf spring (not shown). The force against the holder 68 is hence applied to the pinch rollers 60B, 60C, 62B and 62C via the supporting shaft 66, the bearing members 64A and 64B, and the pinch roller shafts 60A and 62A, so that the pinch rollers 60B, 60C, 62B and 62C can be pressed on the capstan rollers 28B and 28C.

One end of the pinch roller shafts 60A and 62A is loosely inserted into bearing holes 65A and 65A which are formed on the bearing member 64A. Similarly, the other end of the pinch roller shafts 60A and 62A is loosely inserted into bearing holes 65B and 65B which are formed on the bearing member 64B. That is, the inner diameter of the bearing holes 65A, 65A, 65B and 65B is much larger than the outer diameter of the punch roller shafts 60A and 62A.

In the pinch roller mechanism 30, which is constructed in the above-mentioned manner, when the holder 68 is pushed downward by the leaf spring (not shown), and the pinch rollers 60B, 60C, 62B and 62C are pressed on the capstan rollers 28B and 28C as shown in FIG. 5, and the bearing members 64A and 64B independently rotate around the supporting shaft 66. In addition, there are clearances between the pinch roller shafts 60A and 62A and the bearing holes 65A, 65A, 65B and 65B. The pinch rollers 60B, 60C, 62B and 62C can be parallel to the capstan rollers 28B and 28C as a result, even if the capstan shaft 28A and the pinch roller shafts 60A and 62A are not exactly parallel with each other before the pinch roller mechanism 30 is pressed against the capstan 28.

Incidentally, there may be a clearance between each end of the supporting shaft 66 and each of the bearing members 64A and 64B.

Figure 7:
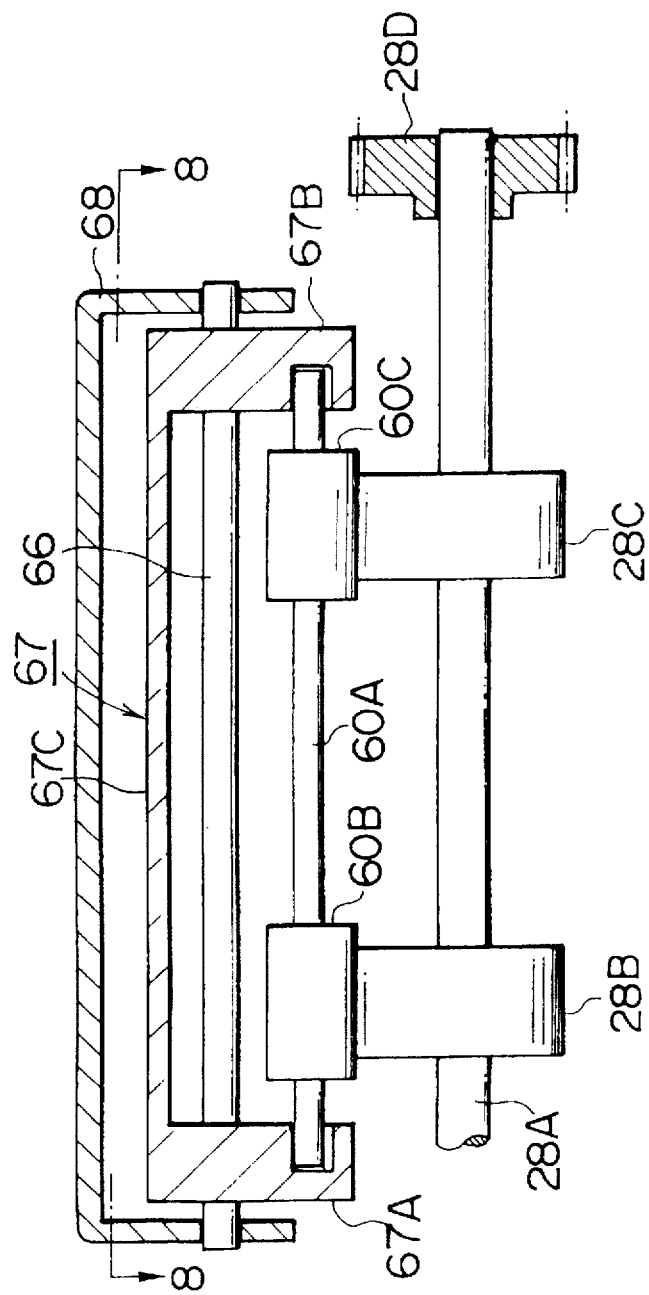
FIG. 7 is a front view illustrating the essential parts of another embodiment of the film transport device according to the present invention.
Figure 8:
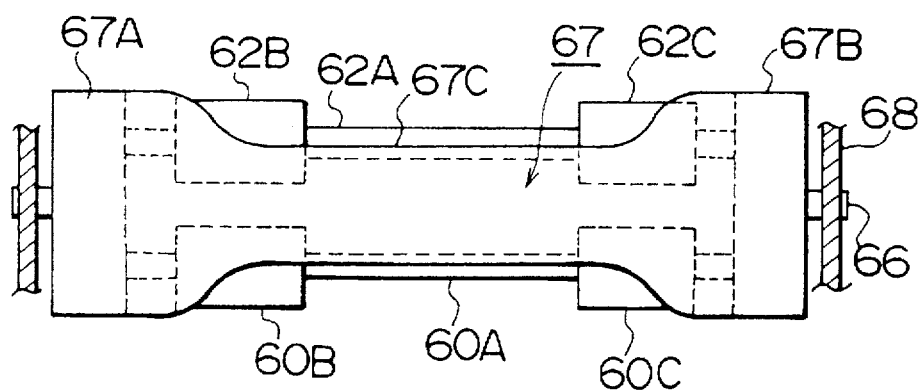
FIG. 8 is a sectional view taken on line 8—8 of FIG. 7.

FIG. 7 is a front view illustrating the essential parts of another embodiment of the film transport device according to the present invention. FIG. 8 is a sectional view taken on line 8—8 of FIG. 7. This embodiment is different from the previously-described embodiment in that the bearing member 67 supporting the pinch roller shafts 60A and 62A is composed of one member. That is, the bearing member 67 consists of right and left bearing parts 67B and 67A, and a connecting part 67C connecting the bearing parts 67A and 67B, and the bearing member 67 is made of an elastic member such as plastic. The connecting part 67C is thin as shown in FIG. 7 and narrow as shown in FIG. 8, and hence it is flexible and can be twisted slightly. The bearing parts 67A and 67B are connected via the connecting member 67C, and the bearing parts 67A and 67B can rotate around the supporting shaft 66 at different angles from each other.

Figure 9:
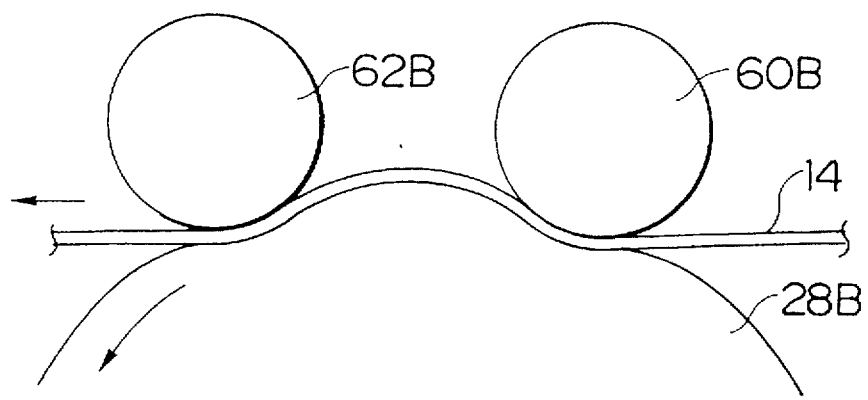
FIG. 9 is an enlarged view illustrating the essential parts of the film transport device according to the present invention.

FIG. 9 is an enlarged view illustrating the essential parts of the film transport device according to the present invention. The same numbers are designated on the same members as those in FIG. 3. As shown in FIG. 9, the diameter of the capstan roller 28B is larger than that of a pair of the pinch rollers 60B and 62B, and the material of the capstan roller 28B is softer than that of the pinch rollers 60B and 62B. The capstan roller 28B changes its shape by the pressure from the pinch rollers 60B and 62B such that the pinch rollers 60B and 62B inroad into the capstan roller 28B.

The material of the capstan roller 28B is hard rubber (e.g. polyurethan rubber), and the material of the pinch rollers 60B and 62B (e.g. hard resin or metal) does not change its shape when they are pressed on the capstan roller 28B.

On the other hand, the film 14 is bent by the pair of the pinch rollers 60B and 62B. The film 14 has been developed to be suitable for the recently-proposed advanced photographic system, and annealed polyethylene naphthalete is used for its base member. Compared with the conventional 135 film of which base member is cellulose acetate, the film 14 has anti-coiling means and is strong against tearing force. If the film 14 is bent by the pinch rollers 60B and 62B, it can be returned to normal.

An explanation will hereunder be given about the operation of the film transport device which is constructed in the above-mentioned manner.

When the holder 68 of the pinch roller mechanism 30 is pushed by the leaf spring, the pinch rollers 60B, 60C, 62B and 62C are pressed on the capstan rollers 28B and 28C via the film 14 as described previously. Even if the capstan shaft 28A is not exactly parallel with the pinch roller shafts 60A and 62A before the pinch roller mechanism 30 is pressed against the capstan 28, the pinch rollers 60B, 60C, 62B and 62C can be parallel to the capstan rollers 28B and 28C.

Then, as shown in FIG. 9, the capstan roller 28B changes its shape by the pressure from the pinch rollers 60B and 62B such that the pinch rollers 60B and 62B inroad into the capstan roller 28B. Thus, the film 14 also inroads into the capstan roller 28B, so that the film 14 can be prevented from sliding and it can be transported desirably when the capstan roller 28B is rotated.

The pair of the pinch rollers 60B and 62B are connected to each other via the bearing members 64A and 64B, and the pinch rollers 60B and 62B are shiftable. If the capstan roller 28B is rotated counterclockwise, and the film 14 is transported at a constant speed in the direction of supplying the film 14, the force is applied to the pinch roller 62B at the film exit side in the direction to exit. In this case, the pinch roller 60B at the film entry side inroads into the capstan roller 28B. On the contrary, when the capstan roller 28B is rotated clockwise, and the film 14 is transported at a constant speed in the direction of rewinding the film 14, the force is applied to the pinch roller 60B at the film exit side in the direction to exit. In this case, the pinch roller 62B at the film entry side inroads into the capstan roller 28B. Thus, if the film 14 is transported in the supply direction or the rewind direction, the film 14 can be transported desirably.

Figure 10:
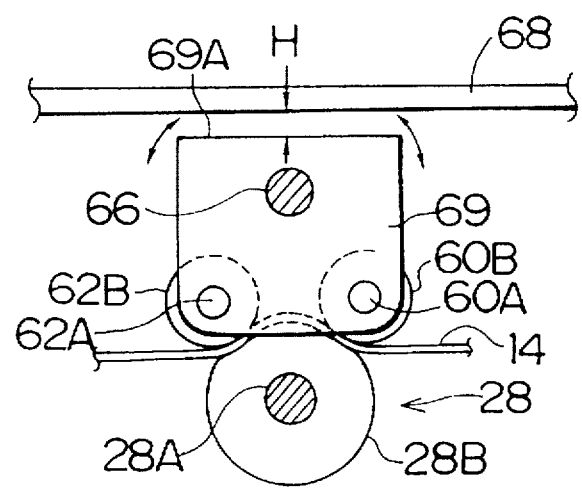
FIG. 10 is a side view illustrating the essential parts of another embodiment of the film transport device according to the present invention.

FIG. 10 is a side view illustrating the essential parts of yet another embodiment of the film transport device according to the present invention. In FIG. 10, parts similar to those previously described with reference to FIG. 3 are denoted by the same reference numerals, and they will not be explained.

In this embodiment, the side shape of the bearing member 69 is different from that of the bearing member 64A shown in FIG. 3. That is, a top end surface 69A of the bearing member 69 is flat, and the bearing member 69 is arranged at the holder 68 via the supporting shaft 66 so that there is a small gap H between the bearing member 69 and the holder 68. Then, if the bearing member 69 rotates by a predetermined amount, the top end surface 69A abuts against the bottom of the holder 68, and the rotation of the bearing member 69 is restricted. If the range in which the bearing member 69 rotates is restricted, there is an advantage in that the parts can be assembled easily.

In these embodiments, the film transport device is applied to the film player; however, it may be applied to any apparatuses which transport the film by means of the capstan and the pinch roller.

As set forth hereinabove, according to the film transport device of the present invention, the pair of the pinch rollers is provided at the rotatable bearing members, and the pinch rollers are pressed on the capstan roller. Hence, the pinch rollers can be tightly in contact with the capstan roller, and the film can be prevented from sliding during transporting. Moreover, there is the clearance provided between the pinch roller shaft and the bearing member, and hence the pinch rollers can be parallel to the capstan roller, so that the pinch rollers can be more tightly in contact with the capstan roller. Further, if the pinch roller at the film exit side shifts in such a direction as to exit, the pinch roller at the film entry side inroads into the capstan roller. Thereby, when the film is transported at a constant speed in the feed or rewind direction, the film can be transported desirably. Incidentally, if the two bearing members, which support the pair of the pinch rollers, are integrated, the number of parts is decreased, and the parts can be assembled easily.

Furthermore, according to the present invention, the diameter of the capstan roller is smaller than that of the pinch roller, so that the pinch roller inroads into the capstan roller by the pressure of the pinch roller. Thus, the film as well as the pinch roller inroads into the capstan roller, so that the film can be prevented from sliding.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A film transporting apparatus for reading frames of film images using a film scanner, which transports a developed film at a constant speed by rotating a capstan roller, said developed film being pinched along both outer edges between said capstan roller and a pair of pinch rollers pressed on said capstan roller, wherein:

one end of both pinch roller shafts of said pinch rollers is arranged at a first bearing member, and the other end of both of said pinch roller shafts is arranged at a second bearing member; and said first and second bearing members are supported rotatably around a supporting shaft provided in a holder wherein each end of said supporting shaft is coupled to said holder.

2. The film transporting apparatus according to claim 1, wherein said supporting shaft is provided at an equal distance from said pinch roller shafts.

3. The film transporting apparatus according to claim 2, wherein said capstan roller is rotated forward and backward, and transports said film at a constant speed in both feed and rewind directions.

4. The film transporting apparatus according to claim 1, wherein said first and second bearing members are supported independently and rotatably by said supporting shaft.

5. The film transporting apparatus according to claim 4, wherein said first and second bearing members are integrated in such a manner that a connecting part therefor is flexible.

6. The film transporting apparatus according to claim 1, wherein said first and second bearing members are arranged at said holder via said supporting shaft to leave a predetermined gap between said holder and each of said first and second bearing members, so that a range in which said first and second bearing members rotate can be regulated.

7. The film transporting apparatus according to claim 6, wherein said first and second bearing members have a top portion having a flat edge wherein said gap is formed between said holder and each of said first and second bearing members.

8. A film transport device which transports a film at a constant speed by rotating a capstan roller, said film being pinched between said capstan roller and a pair of pinch rollers pressed on said capstan roller, wherein one end of both pinch roller shafts of said pinch rollers is arranged at a first bearing member, and the other end of both of said pinch roller shafts is arranged at a second bearing member;

said first and second bearing members are supported rotatably around a supporting shaft provided in a holder wherein each end of said supporting shaft is coupled to said holder; and a clearance is provided between each end of both said pinch roller shafts and each of said first and second bearing members such that said pinch rollers can be parallel to said capstan roller.

9. The film transport device according to claim 8, wherein an inner diameter of bearing holes formed in said first and second bearing members is larger than an outer diameter of said pinch roller shafts, such that said pinch roller shafts are loosely inserted into said bearing holes.

10. A film transport device which transports a film at a constant speed by rotating a capstan roller, said film being pinched between said capstan roller and a pair of pinch rollers pressed on said capstan roller, wherein one end of both pinch roller shafts of said pinch rollers is arranged at a first bearing member, and the other end of both of said pinch roller shafts is arranged at a second bearing member;

said first and second bearing members are supported rotatably around a supporting shaft provided in a holder wherein each end of said supporting shaft is coupled to said holder; and a clearance is provided between each end of said supporting shaft and each of said first and second bearing members such that said pinch rollers can be parallel to said capstan roller.

11. A film transporting apparatus for reading frames of film images using a film scanner, which transports developed film at a constant speed by rotating a capstan roller, said developed film being pinched along both outer edges between said capstan roller and a pair of pinch rollers pressed on said capstan roller, wherein:

one end of both pinch roller shafts of said pinch rollers is arranged at a first bearing member, and the other end of both of said pinch roller shafts is arranged at a second bearing member;

said first and second bearing members are supported rotatably around a supporting shaft provided in a holder wherein each end of said supporting shaft is coupled to said holder; and a diameter of said capstan roller is larger than a diameter of said pinch rollers, and a material of said capstan roller is softer than a material of said pinch rollers, so that said capstan roller changes shape by pressure from said pinch rollers such that said pinch rollers inroad into said capstan roller.

12. The film transporting apparatus according to claim 11, wherein said film is photographic film of which base member is made of annealed polyethylene naphthalete.

13. The film transporting apparatus according to claim 12, wherein said capstan roller is made of hard rubber, and said pinch rollers are made of a material which does not change its shape when said pinch rollers are pressed on said capstan roller.

14. The film transporting apparatus according to claim 11, wherein said capstan roller is made of hard rubber, and said pinch rollers are made of a material which does not change its shape when said pinch rollers are pressed on said capstan roller.

* * * * *